United States Patent [19]

Lipperts

[11] 4,436,241

[45] Mar. 13, 1984

[54] METAL-CERAMIC JOINT

[75] Inventor: Joseph H. F. G. Lipperts, Hengelo, Netherlands

[73] Assignee: Hazemeijer B.V., Hengelo, Netherlands

[21] Appl. No.: 388,438

[22] Filed: Jun. 14, 1982

Related U.S. Application Data

[63] Continuation of Ser. No. 126,286, Mar. 3, 1980, abandoned.

[30] Foreign Application Priority Data

Mar. 5, 1979 [NL] Netherlands ................ 7901740

[51] Int. Cl.³ .................. B23K 1/04; C04B 37/02
[52] U.S. Cl. ................................ 228/124; 445/44
[58] Field of Search ............... 445/44; 228/124, 122, 228/123, 263 A, 263 D, 265, 232, 173 B, 173 C; 427/319

[56] References Cited

U.S. PATENT DOCUMENTS 3,371,406  3/1968  Bronnes .................... 228/124
4,148,973  4/1979  Sexton ...................... 228/263 D

OTHER PUBLICATIONS

Connell et al., *Method of Soldering Refractory Metals*, IBM Tech. Disc. Bull., vol. 3, No. 11, 4/61.

Primary Examiner—Nicholas P. Godici
Assistant Examiner—Marc Hodak
Attorney, Agent, or Firm—Watson, Cole, Grindle & Watson

[57] ABSTRACT

Method for vacuum-tight butt joining by brazing a stainless steel part to a ceramic part, in particular stainless steel end caps to a ceramic housing of a vacuum switch, in which the stainless steel part is annealed prior to the brazing step and the portion of the stainless steel part directly adjoining the ceramic part at the brazing joint location is of a thickness not exceeding 0.8 mm and a height between about 4 and 12 mm.

7 Claims, 4 Drawing Figures

LINEAR EXPANSION OF SOME METALS, METAL ALLOYS AND ALUMINA (CERAMIC)

CHANGE IN LENGTH V.S TEMPERATURE STARTING FROM 800°C FOR SOME METALS, METAL ALLOYS AND ALUMINA (CERAMIC)

METAL-CERAMIC JOINT

This application is a continuation application of application Ser. No. 126,286, filed Mar. 3, 1980, now abandoned.

BACKGROUND OF THE INVENTION

1. Field of the Invention

The present invention relates to a method for creating a vacuum-tight butt brazing joint between a metallized ceramic part and a part made of stainless steel.

2. Prior Art

Generally a bond between a ceramic material and a metal presents problems due in particular to the large differences in the coefficient of thermal expansion between the two materials. In order to cope with these problems there have been developed special bonding alloys mainly iron, nickel and cobalt-based metal alloys of which provide satisfactory results because the coefficients of thermal expansion of these metal alloys correspond rather well with the coefficient of thermal expansion of ceramic material.

If, however, it is necessary that the bonds display anticorrosive properties these alloys will not be satisfactory because of their deficient corrosion resistance. Although it has been attempted to overcome this problem by coating the bond with a copper or gold film, i.e. in order to provide a corrosion-resistant film over the band, such a treatment is rather costly.

German Auslegeschrift No. 2,021,396 discloses a metal-ceramic bond in which the metal comprises more than 50% of nickel and the ceramic material comprises a magnesia. Although the produced bond possesses mutually rather well adapted coefficients of thermal expansion and has moreover a good corrosion resistant character, this metal alloy is unfortunately, rather high priced. Furthermore, the magnesia possesses a low mechanical strength, a low thermal shock stability and a high reactivity with respect to metals.

A considerably cheaper metal which, especially in view of its corrosion resistant properties, is very well suited for vacuum applications, is austenitic stainless steel, as may be apparent among others from an article in "Vacuum", vol. 26-7 by C. Geyari "Design consideration in the use of stainless steel for vacuum and cryogenic equipment" delivered on the occasion of the third Israeli vacuum meeting at Haifa in September 1973. The use of austenitic stainless steel for a brazed metal-ceramic bond is, however, hampered by the bad brazability of the austenitic stainless steel and the large difference in expansion between the austenitic stainless steel and the ceramic material. However, in view of the benefits of austenitic stainless steel research has been conducted in order to find solutions to allow using this material nevertheless.

With respect to the foregoing German Auslegeschrift No. 1,045,305 suggests a method for creating a brazing bond between two materials having strongly different coefficients of thermal expansion as is the case for instance for iron and a ceramic material, wherein an intermediate layer is located between the iron and the ceramic material, the material of this layer having such a coefficient of thermal expansion that the expansion of the metallic part at the location of the joining interface with the ceramic part is compensated for, at least partially.

Assuming a suitable thickness of the intermediate layer, one attains the effect as though at the location of the joining interface there has been fastened a material having a coefficient of thermal expansion substantially the same as that of the ceramic material. However, this known method is rather elaborate.

Another method for creating a brazing bond between a ceramic material and stainless steel has been indicated in a brochure of the firm Friedrichsfeld. In accordance with the latter, the stainless steel is bonded indirectly to the ceramic material through a thermally adapted material such as for instance NiFe42. This method, however, is unfortunately rather laborious and consequently relatively costly.

The object of the present invention is to provide a method of the above-mentioned type in which the aforesaid drawbacks have been eliminated.

SUMMARY OF THE INVENTION

According to the method of the present invention the part of stainless steel and the ceramic part are directly joined by brazing, and the part of stainless steel is annealed before the brazing step and is provided over the entire length of the brazing location with a portion directly adjoining the brazing plane which has a maximum thickness of 0.8 mm and a height of from about 4 to about 12 mm.

Although at present no conclusive explanation can be given for the phenomena, it has become evident after ample investigations that the joints produced by the method according to the invention are highly satisfactory in practice. For that matter the joint according to the invention has been used in a vacuum switch whereupon the joint has been subjected to ultra-high vacuum tightness tests in order to enable the detection of even the slightest leaks. In these tightness tests use has been made of a helium leakage detector having a sensitivity of $6.7 \times 10^{-12}$ mbarl/sec.

No leaks could, however, be detected by the tests performed. Furthermore, the joint proved to be well able to withstand tensile tests for testing mechanical strength. Moreover, it appeared that the joint was stable under repeatedly induced large temperature changes.

It has also become apparent that optimal results are obtained when an austenitic stainless steel is used and the annealing is performed in high vacuum and within an extremely oil-free environment at a temperature of 1050° C. and for a period dependent on the thickness of the material.

It is surmised that, due to the heat treatment, the chromium oxide present at the surface of the austenitic stainless steel disappears by dissociation, thus improving the brazability of the austenitic stainless steel.

Due to the disappearance of the chromium oxide skin, the brazing temperature of about 1050° C. may be decreased to about 800° C. This entails the advantage that the stresses in the joint caused by the different coefficients of thermal expansion of the two parts are considerably decreased.

The things mentioned may directly be deduced from the temperature-expansion curves of the pertaining materials.

Where these curves generally possess a diverging character, a difference in expansion will become less as the temperature is lower so that one has to strive after a brazing temperature as low as possible.

In spite of the possibility of lowering the brazing temperature from about 1050° C. to about 800° C. by employing the method of the invention, it appears that even in this instance the difference in expansion between the stainless steel and the ceramic material is yet relatively large.

The heat treatment according to the invention serves therefore also to nullify the material reinforcement of the austenitic stainless steel caused by the cold deformation thereof. Consequently the metal becomes more ductile so that the stresses in the joint caused by the difference in expansion may be met better. Meeting the stresses in the joint according to the invention is yet further improved, however, by limiting the material thickness of the part of autenitic stainless steel in the neighborhood of and over the entire length of the brazing seam.

The invention will now be elucidated in detail with reference to the drawing.

DETAILED DESCRIPTION OF THE PRESENT INVENTION

Figure 1:
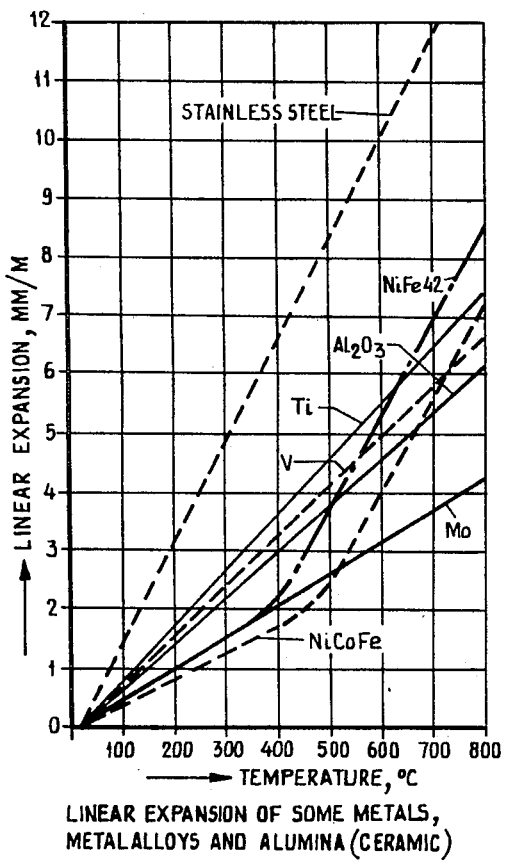
FIG. 1 discloses the linear expansion vs. the temperature for several materials.

With reference to FIG. 1, there is diagrammatically represented the linear expansion as a function of the temperature for several materials up to a temperature of 800° C.

From this diagram it is apparent that the stainless steel possesses a coefficient of thermal expansion which differs greatly from the coefficient of thermal expansion of the ceramic material $Al_2O_3$. This is in contrast with for instance, the metal alloys NiFe42 and NiCoFe, which have been specially developed for brazing bonds with ceramic materials. From FIG. 1 it is also apparent that for most materials, the difference in expansion increases as the temperature is raised. The problem of the difference in expansion may therefore partially be compensated for by keeping the brazing temperature as low as possible.

Figure 2:
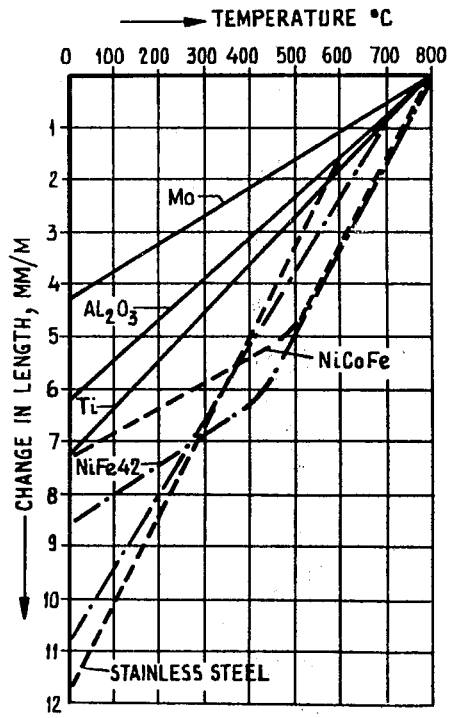
FIG. 2 discloses the change in length vs. the temperature for several materials.

In FIG. 2 there is represented substantially the same diagram as in FIG. 1 although starting from a temperature of 800° C. in this instance. When furthermore assuming that at this temperature the different materials have been bonded together and thus possess like dimensions, the cooling down will mean that stresses will occur due to the change in length. Based on the difference in length at room temperature and the modulus of elasticity for the pertaining material, the stress at room temperature may be calculated.

The diagram of FIG. 2 likewise shows that in case of the ductile metals, such as stainless steel, part of the stress caused by the difference in change of length may be compensated for by the internal flow of the metal. By taking care that the metallic part in a joint remains as ductile as possible, the problem of the difference is expansion may then be lessened.

In FIG. 5 there is shown a vacuum switch in which the sealing caps 5 and 6, respectively, have been bonded to the ceramic house 1 in accordance with the method of the present invention. Apart from the ceramic house 1 and the sealing caps 5 and 6, the vacuum switch usually includes also in essence a fixed and a movable contact 2 and 3, respectively, with the associated contact rods, a bellows 7 required for the vacuum tight passage of the movable contact rod and a screen 4 serving to protect the ceramic house 1. For improving the corrosion resistance, the sealing caps 5 and 6 have been made of an austenitic stainless steel, for instance a steel designated by the DIN-standards by the number 1.4301 or 1.4306.

For enabling the brazing at a low temperature, the sealing caps have been annealed in high vacuum and is an extremely oil free environment, whereby it has become apparent that the best results may be obtained when selecting a duration of the annealing treatment of about one hour per each millimeter of material thickness. The skin of chromium oxide dissociates so that the sealing caps become brazable at a temperature of about 800° C. while the material becomes ductile in such a degree that stresses may partially be compensated for by internal plastic deformation of the sealing caps.

Figure 3:
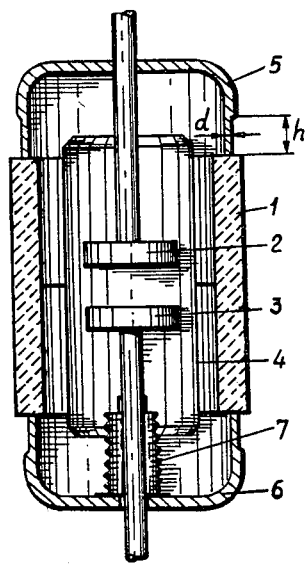
FIG. 3 represents a vacuum switch in which use is made of the joint according to the invention.

To further compensate for the stresses in the joint according to the invention, use is made of a part of the sealing caps directly adjoining the brazing plane and extending over the entire length of the brazing seam having special dimensions, the thickness of which in FIG. 3 has been indicated by d and the height of which by h.

Measured from the brazing plane, this part extends over a height h which is in fixed relation to the material thickness d. This ratio may vary from 5, to 15 times the material thickness d but preferably amounts to 10 times the material thickness d. In this way it is achieved that optional stresses may be compensated for by having the pertaining parts of the sealing caps 5 and 6, respectively adjoining the ceramical house 1 to take somewhat oblique positions, with respect to the brazing plane.

In case the height h is made smaller than indicated above, there will be a considerable increase of the risk that the end caps 5 and 6 will be sheared from the ceramic house 1 due to stresses.

Figure 4:
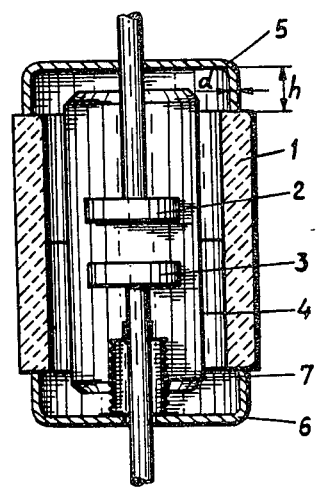
FIG. 4 represents another embodiment of the vacuum switch according to the invention.

In FIG. 4 there is represented an embodiment in which the end caps as a whole satisfy the requirement of the material thickness d. The part of the end caps running parallel to the contact plane then have to be located at a minimum distance h from the brazing plane.

In accordance with the above-described method, very good bonds between stainless steel and ceramic material may be produced in a simple way. Although the method according to the invention offers very good possibilities of use in case of vacuum switches, other applications are very well conceivable, such as in vacuum discharge devices. Furthermore, it should be remarked that instead of $Al_2O_3$, other ceramic materials may be used. Accordingly, the invention is not restricted to the special embodiments and materials disclosed and discussed above.

I claim:

1. A method for producing a vacuum-tight butt brazing joint between a metallized ceramic part and a stainless steel part, said method comprising the steps of
   (a) shaping the end portion of the stainless steel part to be joined with the metallized ceramic part such that it has a height of from about 4 mm to about 12 mm and a maximum thickness along this height of 0.8 mm,
   (b) annealing at least said shaped end portion of said stainless steel part, and (c) brazing said annealed and shaped end portion of said stainless steel part directly to said metallized ceramic part.

2. The method as defined in claim 1 wherein said stainless steel part is composed of austenitic stainless steel, and wherein the annealing in step (b) is conducted in an evacuated, oil-free environment and at a temperature of 1050° C.

3. The method as defined in claim 2 wherein the time period during which the annealing in step (b) is conducted based on the thickness of the end portion of said stainless steel part in a ratio of about 1 hour per 1 mm of thickness.

4. The method as defined in claim 1 wherein the brazing in step (c) is conducted at a temperature of about 800° C.

5. The method as defined in claim 1 wherein the ratio between the thickness of the end portion of said stainless steel part and its height is between about 1 and 10.

6. The method as defined in claim 1 wherein the ceramic material includes at least 95% of $Al_2O_3$.

7. A method of producing a vacuum switch including a metallized ceramic housing and two stainless steel caps, said two stainless steel caps being joined to said metallized ceramic housing by separate vacuum-tight butt brazing joints, said method being produced by the steps of (a) providing a metallized tubular ceramic housing which has opposite annular end surfaces, (b) providing two stainless steel caps, each including a head part and a tubular part extending away from the head part, the tubular part defining a free annular end surface opposite the head part, (c) shaping the tubular part of each of said two stainless steel caps such that the portion thereof which extends from the associated free annular end surface to a location therealong about 4 mm to about 12 mm towards the associated head part has a thickness of 0.8 mm, (d) annealing at least said portion of each of said two stainless steel caps, and (e) brazing the respective free annular end surfaces of said two stainless steel caps directly to the respective opposite annular end surfaces of said metallized tubular ceramic housing.

* * * * *